United States Patent
Boucher et al.

(10) Patent No.: US 6,675,387 B1
(45) Date of Patent: Jan. 6, 2004

(54) SYSTEM AND METHODS FOR PREPARING MULTIMEDIA DATA USING DIGITAL VIDEO DATA COMPRESSION

(75) Inventors: Antoine Boucher, London (CA); Paul Ernest McRae, London (CA); Tong Qiu, London (CA)

(73) Assignee: Liberate Technologies, San Carlos, CA (US)

( * ) Notice: Subject to any disclaimer, the term of this patent is extended or adjusted under 35 U.S.C. 154(b) by 0 days.

(21) Appl. No.: 09/287,235

(22) Filed: Apr. 6, 1999

(51) Int. Cl.$^7$ .......................... H04N 7/173; H04N 7/12; H04H 1/04; G06F 15/16
(52) U.S. Cl. ................. 725/105; 375/240.01; 370/487; 709/218
(58) Field of Search .................. 725/105; 709/218; 370/487; 375/240.01

(56) References Cited

U.S. PATENT DOCUMENTS

| | | | |
|---|---|---|---|
| 5,563,892 A | * 10/1996 | Kostreski et al. | 370/487 |
| 5,614,952 A | * 3/1997 | Boyce et al. | 375/240.01 |
| 6,018,768 A | * 1/2000 | Ullman et al. | 709/218 |

* cited by examiner

Primary Examiner—Howard Britton
Assistant Examiner—Allen Wong

(74) Attorney, Agent, or Firm—Allan Jacobson

(57) ABSTRACT

Systems and methods are described for preparing multimedia data using digital video data compression. Various embodiments of the invention use pre-rendering and encoding techniques that format the video image data into fat macroblocks. The fat macroblocks include header information that identifies the beginning locations of strips of macroblocks representing slices of the image, and of the macroblocks disposed within the strips. The header information enables macroblocks disposed in a strip of fat macroblocks to be individually addressed thereby providing transmission bandwidth, data processing, and data storage advantages for preparing and transmitting data for updating video images including less than full screen motion. The advantages are achieved in part because updates only require that the first macroblock of each strip of macroblocks be transmitted. Further efficiencies can be realized by using a zero displacement motion vector instead of the actual values of the first macroblock if the first macroblock is not changing. Methods using fat macroblock formatted data sets provide advantages for encoding and transmitting large bitmaps of static content, scrolling the static content, enabling animation of small areas of the display, supporting picture-in picture functionality, and allowing for overlay and combination of different image data from different sources on the display. The methods of preparing the multimedia data include pre-rendering a bitmap to create a compressed form of the bitmap, and determining a viewable area of the video images to be displayed. The viewable area of the video images can be smaller than the full-sized area of the video images.

54 Claims, 4 Drawing Sheets

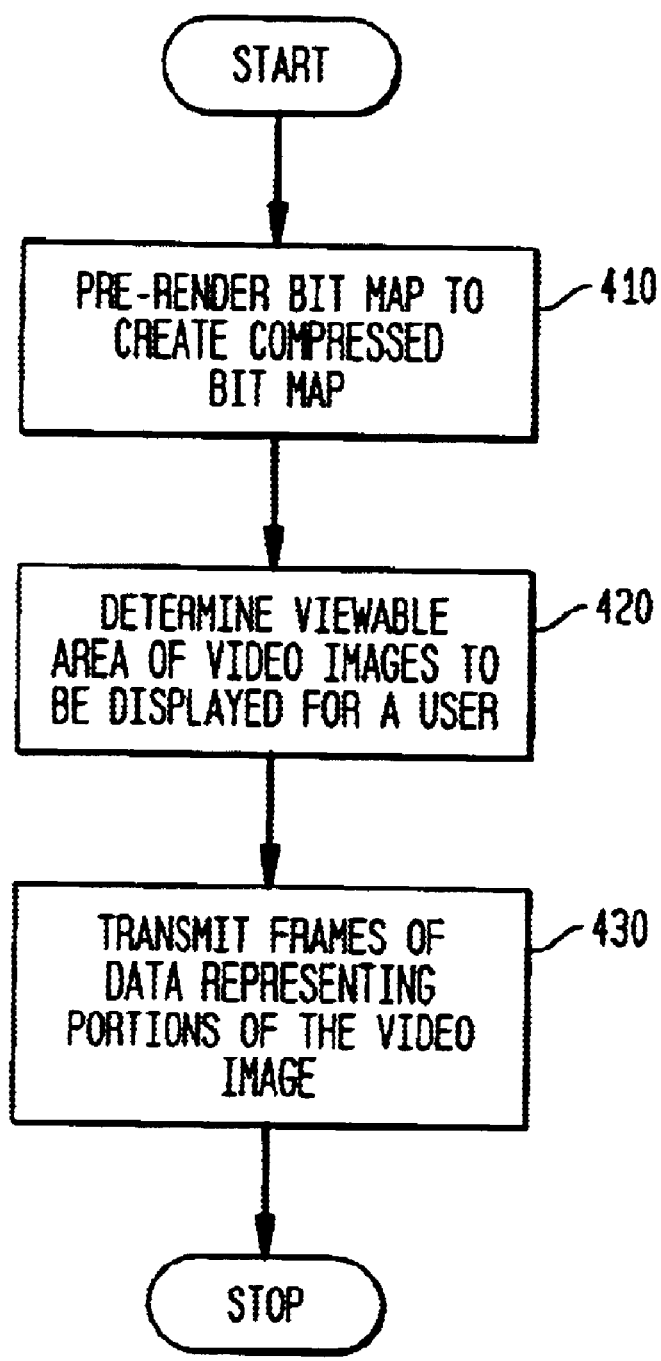

SYSTEM AND METHODS FOR PREPARING MULTIMEDIA DATA USING DIGITAL VIDEO DATA COMPRESSION

CROSS-REFERENCES TO RELATED APPLICATIONS

This application relates and incorporates herein by reference as if fully set forth herein U.S. patent application Ser. No. 09/071,549, entitled "Labelling of Links in Hypertext Document Images," filed, May 1, 1998, and having inventors Antoine Boucher, Wayne C. Louie, Paul E. McRae, and Peter G. N. Scheyen; and U.S. patent application Ser. No. 09/255,052, entitled "System and Method for Interactive Distribution of Selectable Presentations," filed Feb. 22, 1999, and having inventors: Antoine Boucher; James Lee Fischer, and Allan E. Lodberg, the entire contents of all of which are hereby incorporated herein by reference as if fully set forth herein.

BACKGROUND OF THE INVENTION

1. Field of the Invention

The invention relates generally to the field of preparing multimedia data for transmission. More particularly, the invention relates to using digital video encoding techniques to provide efficient use of channel bandwidth and provide updates to video images.

2. Discussion of the Related Art

The acceptance of digital video compression standards, such as those included in the Motion Picture Expert Group (MPEG) standards (including MPEG-2), combined with high-bandwidth communication infrastructure have positioned cable television users with many service selections including video-on-demand, multi-party interactive video games, and video teleconferencing. Cost-effective versions of these services, as well as Internet access using cable television, require improved video composition and display techniques to assure that user expectations regarding clarity of image and speed of response are met.

Previous solutions for preparing multimedia data using digital video data compression include those described by U.S. Pat. No. 5,623,308, issued to Civanlar et al. on Apr. 22, 1997 and U.S. Pat. No. 5,691,768, issued to Civanlar et al. on Nov. 25, 1997. According to these solutions, an encoder produces a single coded and compressed output stream in slices of macroblocks of pixel data. The output bitstream is demultiplexed into separate resolution bitstreams using identifier for each slice and for the first macroblock of each slice. The decoder processes the slices within the bitstreams of different resolutions received from plural sources using the identifiers for each slice to produce a single composite bitstream of successive slices.

This technique is well adapted to provide compressed bitstreams for full-screen motion videos. However, the technique does not provide additional compression for partial screen motion, or partial screen updates. Examples of partial screen motion include partial screen animation, scrolling an image that is larger than the viewing area to view obscured areas, and picture-in-picture motion. Partial screen updates include variable input fields, user selection graphics, and segmented images. What is needed is a system and method that provides additional compression and image clarity advantages for partial screen motion and partial screen updates.

SUMMARY OF THE INVENTION

A primary goal of various embodiments of the invention is to overcome problems in previous solutions for preparing data and transmitting data for updating video images that have less than full screen motion. The previous data preparation and transmission solutions provide encoding and decoding using frame formats and address full-screen motion video. These solutions do not adequately address channel throughput and set-top box processing limitations by using software efficiencies that can be realized by updating and transmitting only portions of the frame data for updating video images that have less than full screen motion.

In accordance with these goals, there is a particular need for pre-rendering, encoding and otherwise formatting data for updating video images that have less than full screen motion. Thus, it is rendered possible to simultaneously satisfy the above-discussed requirements of preparing and transmitting the video data for less than full screen motion, which, in the case of the prior art, are not simultaneously satisfied.

A first aspect of the invention is implemented in an embodiment that is based on a method for preparing multimedia data using digital video data compression. The method includes pre-rendering a bitmap to create a compressed form of the bitmap, the bitmap including content of a series of video images of the multimedia data, the video images having a full-sized area; and determining a viewable area of the video images to be displayed, the viewable area of the video images is smaller than the full-sized area.

A second aspect of the invention is implemented in an embodiment that is based on a method for transmitting multimedia data using digital video data compression. The method includes the steps of the first aspect and adds the step of transmitting frames of data representing portions of the video images to processing equipment, the processing equipment is connected to at least one display.

A third aspect of the invention is implemented in an embodiment that is based on a system for transmitting multimedia data using digital video compression. The system includes a crawler adapted to update references to media assets disposed in markup language files, and provide content including markup language files to a renderer; the renderer adapted to render the content into fat macroblock formatted data sets; a rendered cache adapted to store files of the fat macroblock formatted data sets; a server adapted to submit requests for data to a browser, and deliver encoded multimedia data streams to a cable network; the browser is adapted to respond to requests from the server by collecting data from the crawler and the rendered cache, and submit the collected data to the server.

A fourth aspect of the invention is implemented in an embodiment that is based on a method of distributing Internet data to digital cable devices. The method includes pulling initial content from the Internet; pre-rendering a bitmap corresponding to the initial content to create a compressed form of the bitmap, the bitmap corresponding to a series of video images of the multimedia data, the video images having a full-sized area; determining a viewable area of the video images to be displayed, the viewable area of the video images is smaller than the full-size area; and transmitting frames of data representing portions of the video images to digital cable processing equipment, the digital cable processing equipment is connected to displays for more than one user.

A fifth aspect of the invention is implemented in an embodiment that is based on a method of using a television channel to provide Internet access. The method includes pulling initial content from the Internet; pre-rendering a bitmap corresponding to the initial content to create a compressed form of the bitmap, the bitmap corresponding to a series of video images of the multimedia data, the video images having a full-sized area; determining a viewable area of the video images to be displayed, the viewable area of the video images is smaller than the full-size area; storing multimedia data elements including the bitmap in a server system; multiplexing the multimedia data elements into frames of data; transmitting frames of data from the server system to a cable network; and transmitting streams of data representing portions of the video images in a television channel to digital cable processing equipment, the digital cable processing equipment is connected to at least one display for a user.

A sixth aspect of the invention is implemented in an embodiment that is based on a method of providing a picture-in-picture display. The method includes pre-rendering a bitmap to create a compressed form of the bitmap, the bitmap including content of a series of video images of the multimedia data, the video images having a full-sized area; determining a viewable area of the video images to be displayed, the viewable area of the video images is smaller than the full-sized area; rendering the content of the video image; and updating macroblocks for a portion of the viewable area corresponding to a picture-in-picture display, the updated macroblocks including one or more of predicted frames and bi-directional frames including images corresponding to full motion for the picture-in-picture display.

These, and other, goals and aspects of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

A clear conception of the advantages and features constituting the invention, and of the components and operation of model systems provided with the invention will become more readily apparent by referring to the exemplary, and therefore non-limiting, embodiments. The embodiments are illustrated in the drawings accompanying and forming a part of this specification, wherein like reference characters (if they occur in more than one view) designate the same parts. It should be noted that the features illustrated in the drawings are not necessarily drawn to scale.

FIG. 4 illustrates a method for transmitting multimedia data using digital video compression, representing an embodiment of the invention.

DESCRIPTION OF PREFERRED EMBODIMENTS

Figure 1:
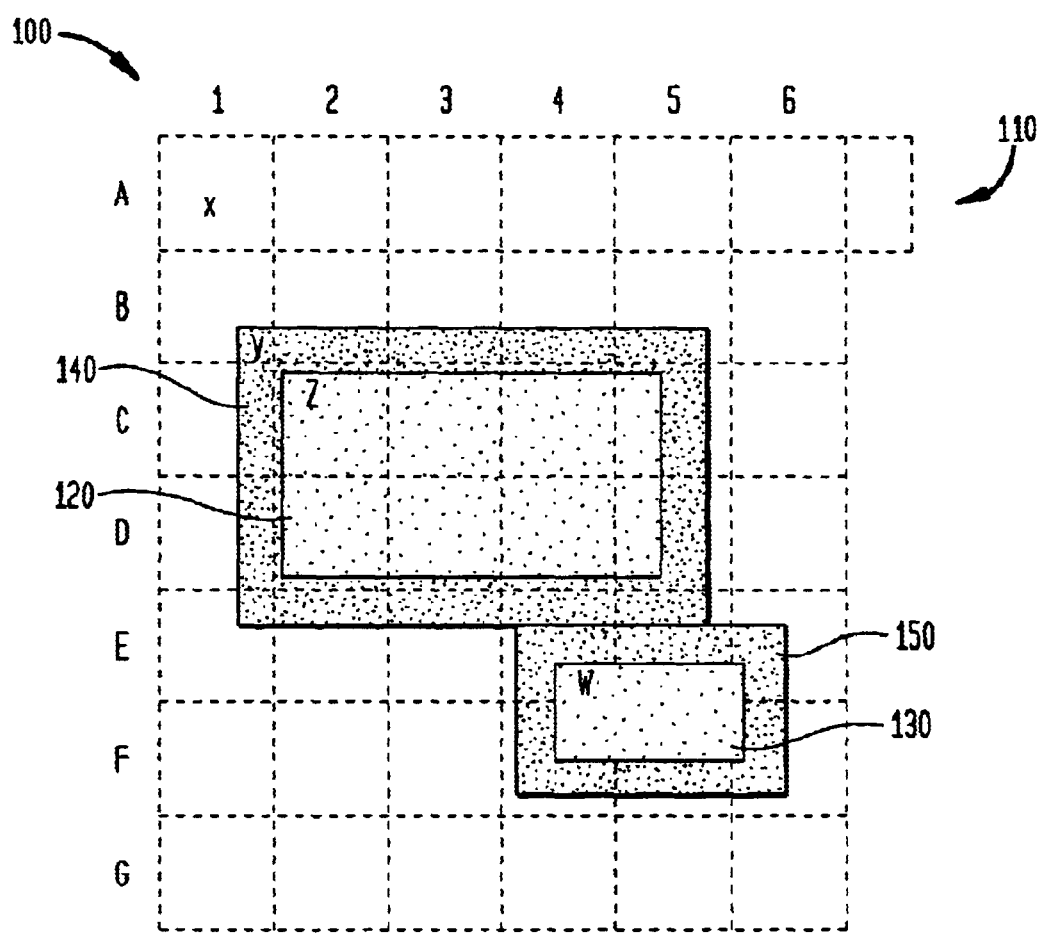
FIG. 1 illustrates a fat macroblock formatted image layout, representing an embodiment of the invention.

The invention and the various features and advantageous details thereof are explained more fully with reference to the non-limiting embodiments that are illustrated in the accompanying drawings and detailed in the following description of preferred embodiments. Descriptions of well-known components and processing techniques are omitted so as not to unnecessarily obscure the invention in detail.

Various embodiments of the invention overcome problems in previous solutions for preparing data and transmitting data for updating video images that have less than full screen motion. The previous data preparation and transmission solutions provide encoding and decoding using frame formats and address full-screen motion video. These solutions do not adequately address channel throughput and set-top box processing limitations by using software efficiencies that can be realized by updating and transmitting only portions of the frame data for updating video images that have less than full screen motion.

Various embodiments of the invention apply video data compression techniques to update and transmit frame data including only portions of the data sent by previous solutions. Only the data required for updating video images within a predefined viewable area (or display window) are encoded and transmitted. Further reduction of the data is accomplished by only encoding data for macroblocks that require updating. This reduction is accomplished using a fat macroblock format including fat macroblock files and a header entry for each group of fat macroblocks representing a horizontal slice of the image. The groups of fat macroblocks representing horizontal slices of the image are also referred to herein as "strips", or "fat macroblock strips". For a series of images having less than full screen motion, substantial data processing and transmission channel bandwidth reductions are realized. Despite the strip-based structure, the fat macroblocks format allows access to each macroblock in the image data set randomly, not just on a strip by strip basis.

According to various embodiments of the invention, the video image content includes fixed content and variable content. Fixed content includes portions of the video image content that will not vary with respect to its lifetime within an image. For some embodiments, the lifetime is the time for which an image including content is displayed. Examples of fixed content include background color or images, static text and static images.

Variable content includes portions of the content that may vary with respect to its lifetime within an image. For example, a form element may have its text updated, a radio button can be toggled, and an area of the screen designated as a picture-in-picture display will also be updated during the lifetime of the image. An image can be animated, with or without timing (e.g., an animated GIF).

Various embodiments of the invention use data sets organized in macroblocks to represent portions of the video image. The macroblocks represent geometric arrays of pixels on the display.

MPEG formatted data uses three basic types of frames in encoding a video stream: an intra-frame, a predicted frame and a bi-directional frame. The intra-frame, or i-frame, is used to provide still frame images that fill the entire screen. The capture of an i-frame results in a pivot point from which p-frames and b-frames (discussed below) can modify the appearance of the screen. An i-frame does not use any predicted, previous, or future frames.

The predicted frame, or p-frame, represents moving a captured i-frame via a motion vector or replacing part of a screen. Predicted-frames come in a linear sequence after an i-frame and represent transformations on that i-frame. The bi-directional frame, or b-frame, can be sent in a stream that represents transformations on both an i-frame and a p-frame. The b-frame is a frame that requires the context of previous and future frames.

Various embodiments of the invention use i-, p-, and b-frame attributes to reduce real-time processing and software requirements for manipulating and processing image data at the receiving client platform (e.g., a set-top box or addressable processing equipment). These embodiments combine video processing ability at the set-top box (STB) with "pre-rendered" format data comprising MPEG compliant data to minimize software and processing required at the STB, and to provide faster downloading of content to a user. The methods are especially advantageous for Internet browsing on a TV screen using an oversized bitmap of the web page contents. The user can readily view a portion of the page (with sufficient magnification and clarity of text) and can scroll to view other portions of the page as desired.

The invention can be implemented using the existing MPEG standard to provide the user with partial screen updates, picture in picture, smooth scrolling, and animation. The concepts described can also be applied to any digital video compression system.

Various embodiments of the invention can be implemented to provide processes and data formats that encompass preparation and transmission of content using the MPEG standard and enable MPEG devices to exhibit capabilities beyond what their designers intended.

Definitions

For the purposes of this document, the following terms are defined:

Passive Area—The portion of variable content that will not change as the variable content changes. For example, the non-changing box around the changing text of a text entry form element.

Active Area—The portion of an instance of a variable content that may change as the variable content changes. For example, the internal shape or color of a radio button that is toggled, or the text contents of a text form element, or the area of the screen updated during a scroll or picture-in-picture operation.

Fat Macroblock—A specific encoding of a macroblock such that, when read back or used later, the internal values of the macroblock can be easily manipulated without having to bit wise and/or byte wise unpack the macroblock before such manipulation prior to encoding or re-encoding the macroblock before delivery.

Fat Macroblock Format—The fat macroblock (FMB) format organizes the macroblocks along with additional information that makes access and manipulation of the macroblock data fast. The format enables the application to combine macroblock data from several sources into a single video operation. In some embodiments of the invention, all macroblocks used in an image are encoded using the same quantization matrix as the original intra-frame of the image. The intra-frame is the base data upon which updated information is added. Note that in some embodiments, each macroblock can be encoded with its own quantization scale factor. The FMB format is described in greater detail in the Fat Macroblock Format section below.

Changeable Region—A portion of the user screen which can possibly be updated via the content after the initial display. For example, scrolling a region, or changing the value of a form element anywhere in that region.

Permanent Region—A portion of the user screen that will not change in any way via the content. For example, an HTML frame that has no form elements, no animated GIFs, does not need to be scrolled by the user, and contains no other content that might be updated or changed. Another example is a runtime chosen and/or inserted static image on top of the original content.

Fat Macroblock Format

FIG. 1 shows a fat macroblock (FMB) formatted image layout 100 representative of some embodiments of the invention. The FMB formatted image includes active content areas. The macroblocks can be organized as macroblock strips corresponding to horizontal slices of the video images, such as the macroblock strip 110 of row A. The FMB formatted image layout 100 shows how active content areas are laid out in an MPEG system with 16×16 pixel macroblocks. The macroblock side dimension of 16 is also referred to as "N" below. Note that placing an N/2, or 8 pixel, border surrounding each active content area ensures that each active area of the content is completely contained within macroblock boundaries, and as such can be updated using p-frames.

The FMB formatted image layout 100 includes a 6×7 array of macroblocks; "x" denotes the fat macroblocks that make up the entire image. The macroblocks are arranged in horizontal "strips" labeled A through G, and in columns 1 through 6.

The FMB formatted image layout 100 also includes a first active area 120, a second active area 130, a first border area 140, and a second border area 150. The first active area 120 (designated "z") is the active, variable area that will be updated, and is surrounded by the first border area 140 (designated "y"). The first border area 140 provides an 8 pixel border around the first active area 120. Adding the border to active elements of the picture ensures that the macroblocks changed to update any active element are not shared with any other active element.

The second active area 130 (designated "w") is surrounded by the second border area 150 that provides an 8 pixel border around the second active area. The second active area 130 is included to demonstrate that use of the 8 pixel border will result in an image in which multiple variable areas do not share any macroblocks.

To update the first active area 120, a p-frame is created containing data for macroblocks C2 through C5 and D2 through D5. The rest of the macroblocks will be sent as motion vectors having a value of zero, or as skip blocks. To update the second active area 130, macroblocks E4 through E6 and F4 through F6 are sent with new data, and the remaining macroblocks are sent as motion vectors having a value of zero, or as skip blocks.

Figure 2:
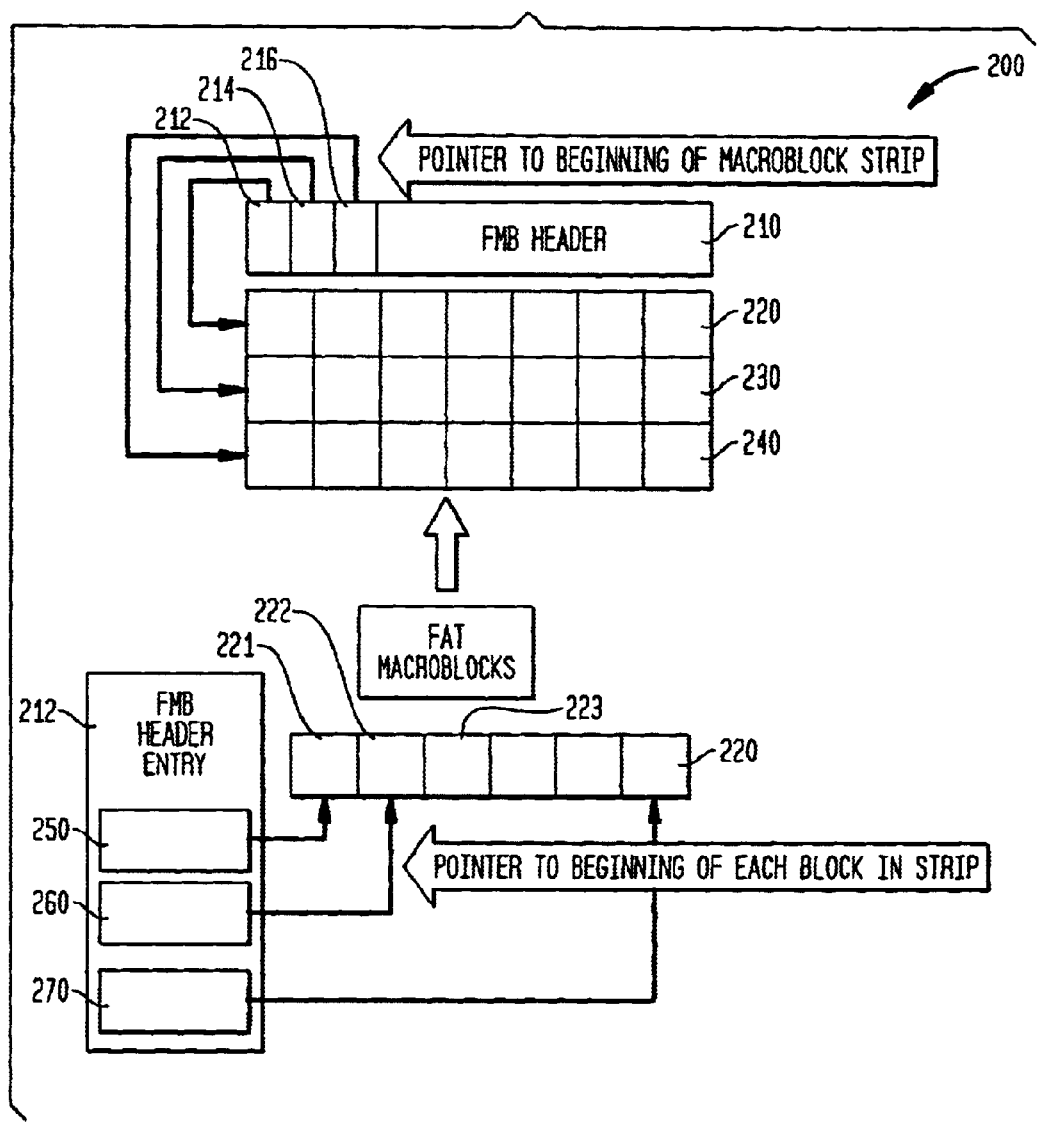
FIG. 2 illustrates strips of fat macroblocks with corresponding fat macroblock headers, representing an embodiment of the invention.

FIG. 2 illustrates an FMB formatted image 200 including an FMB image header, representing an embodiment of the invention. This FMB format enables the application to quickly and easily combine macroblocks from various sources into a single video operation, typically a sequence of i- and p-frames.

The data for the FMB formatted image 200 includes at least one strip of macroblocks. In the FMB format an FMB image header 210 is provided for the entire image. The FMB formatted image 200 shown in FIG. 2 includes a first macroblock strip 220, and second macroblock strip 230 and a third macroblock strip 240.

The FMB image header 210 includes an entry for each macroblock strip. The FMB image header 210 includes a first header entry 212 corresponding to the first macroblock strip 220, a second header entry 214 corresponding to the second macroblock strip 230, and a third header entry 216 corresponding to the third macroblock strip 240. The entry for each strip points to the location of the beginning of the strip and also contains a pointer to the beginning of each macroblock within the strip.

Each fat macroblock has its own header that contains information such as the quantization-scaling factor. As shown in FIG. 2, the first header entry 212 includes a first macroblock entry 250, a second macroblock entry 260, and a third macroblock entry 270. The first macroblock entry 250 corresponds to the first macroblock 221 in the first macroblock strip 220. The second macroblock entry 260 corresponds to the second macroblock 222, and the third macroblock entry 270 corresponds to the third macroblock 223. Given multiple sources of FMB data in this format, the elements from each file can be extracted and assembled into a p-, b-, or i-frame and delivered to the decoder. The FMB format ensures that the assembling process has enough information to create a valid frame from disparate data sources.

A macroblock is the smallest unit that can be identified without decoding the bitstream. Various embodiments of the invention enable the application to compose an update from macroblocks from several sources without having to decode and re-encode the macroblocks. The pointer is provided in the each strip header entry for each macroblock in the strip because the macroblocks vary in bit length. The application can use these pointers to access any macroblock in the data set (stream) individually for use in composing an update frame.

System for Preparing Multimedia Data Using Digital Video Data Compression

Figure 3:
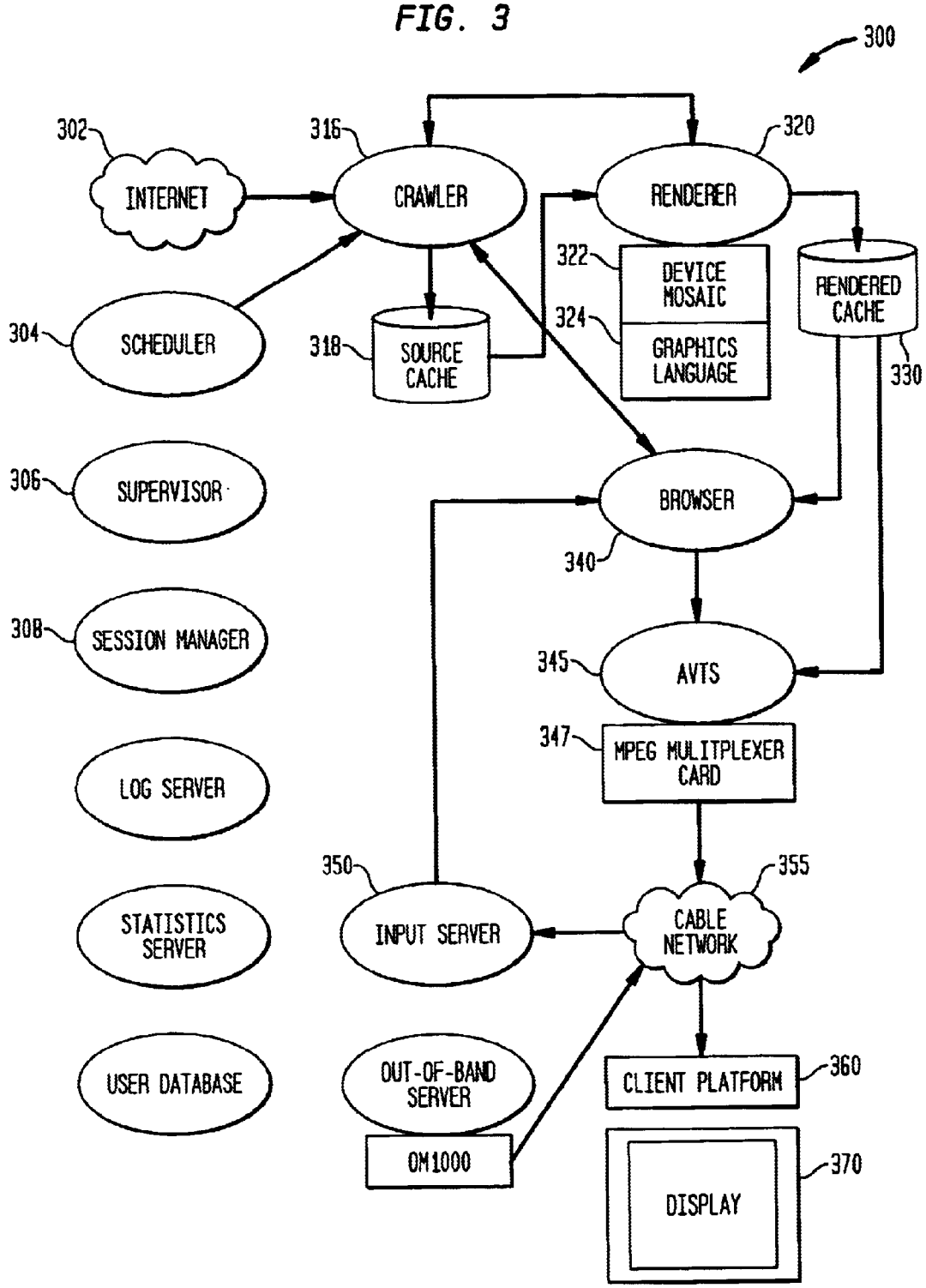
FIG. 3 illustrates a system for transmitting video data, representing an embodiment of the invention.

Various embodiments of the invention providing a system for preparing multimedia data 300 using digital video data compression are represented by FIG. 3. The system for preparing multimedia data 300 includes a server system, a client, an interactive application environment library, and content tools. Various embodiments of the system are described in detail in U.S. patent application Ser. No. 09/255,052, entitled "System and Method for Interactive Distribution of Selectable Presentations," filed Feb. 22, 1999, which is incorporated herein by reference as if fully set forth herein.

The system for preparing multimedia data 300 pulls content from the web in the form of hypertext markup language (HTML), pulls interactive video (ITV) in the form of television markup language (TVML), and stores the HTML and ITV data in the server system. TVML is an eXtensible markup language (XML) language designed to specify interactive content for television. A rendering process converts content into FMB formatted data sets that can be easily displayed. The FMB data sets can be stored as fat macroblock files and as files in a video markup language. The video markup language files are adapted to provide information that directs placement of data from the FMB files on the bitmap and on the screen or display.

The server system is connected to the Internet 302, and can include a scheduler 304, a supervisor 306, a session manager 308, a crawler 316, a source cache 318, a renderer 320, a rendered cache 330, a browser 340, an audio video terminal server 345, and an input server 350.

The server system is connected to the client by a cable network 355. The client includes a client platform 360, and is connected to a display 370.

The interactive application environment (IAE) can include a navigator, applications related to the navigator, and an IAE library. The content tools include a TVML, a TVML pre-viewer, and a content converter.

The functions of several components of the server system are important for the preparation of the multimedia data using the FMB format.

For some embodiments of the invention, the scheduler 304 makes regular, scheduled requests to the crawler 316 to fetch content from pre-configured sites. The scheduler 304 is adapted to ensure that the content is fetched, rendered, and copied to the appropriate locations for use.

For some embodiments of the invention, the supervisor 306 is responsible for starting up the system and monitoring the state of the system. A configuration file is read when the supervisor 306 is started up and specifies which processes are to be started on the host computer. The host computer typically uses a Unix operating system, but the invention can function using other operating systems. The supervisor 306 then creates the specified processes and verifies that the specified processes are running correctly. During system operation, the supervisor 306 monitors the state of the processes and performs appropriate recovery operations (for example, restarting a failed process) based on information in the configuration file.

For some embodiments of the invention, the session manager 308 is the flash point for interactive session creation. System resources (such as applications and servers) register with the session manager 308 on startup. When a client (e.g., a set-top box) attempts to log on to the system, the session manager 308 checks to ensure that the appropriate resources are available and creates a session. The application required by the session is then notified. During the session, if another application is requested, control passes back to the session manager 308. Finally, when the session is terminated, the session manager 308 makes sure that all of the resources allocated to the session are freed.

A crawler 316 can be used to access and pull in content from the Internet 302. Based on requests, the crawler 316 connects to a web server at a particular site and pulls in content, which may be in the form of TVML or HTML. The content is then stored on the server in a disk cache, such as the source cache 318. The crawler 316 ensures that all of the assets relating to a particular piece of content are pulled and cached and performs some transformations on the content (converting http:// to file:// where appropriate, for example).

The source cache 318 can include HTML and TVML data that has not yet been pre-rendered into the FMB format. The source cache 318 can also include TVML files that specify image files already formatted as FMB data sets.

The renderer 320 is adapted to create FMB data sets from different input sources. The input sources can include markup languages, standard and non-standard image file formats, and live image data (e.g., a telecast). The renderer 320 contains the compression algorithm, and outputs results from the compression algorithm as described by the FMB data set format. The renderer 320 converts video data into an FMB format. In some embodiments, the renderer 320 takes in HTML and TVML, with their accompanying assets (GIF's, JPG's, pre-encoded FMB files), and creates the FMB formatted data set. The renderer 320, or rendering engine, can include a device mosaic 322 and a graphics language 324.

The rendered cache 330 includes bitmaps and frames formatted according to the FMB format in FMB files. The rendered cache 330 can also include markup language files indicating how the FMB files are assembled for a particular image. The indications of how the FMB files are assembled for a particular image can also be stored in a database, or as part of the FMB file itself.

The browser 340 collects data from the crawler 316, and the rendered cache 330 in response to requests from the audio/video terminal server (AVTS) 345, and forwards the data to the AVTS for transmission to the user.

The audio/video terminal server (AVTS) 345 is responsible for delivering encoded data streams (e.g., MPEG video and Dolby AC-3 audio streams) to client platforms 360 (e.g., set-top boxes). A special MPEG multiplexer card 347 can be controlled by the AVTS 345 to stream data onto one or more cable networks 355.

The AVTS 345 can also send terminal commands through the cable network 355 to the client platform 360, e.g., a set-top box. The terminal commands can instruct the set top box to draw text and graphic overlays, display hot regions, and realize input widgets. The input widgets can include those described by U.S. patent application Ser. No. 09/071,549, entitled "Labelling of Links in Hypertext Document Images," filed, May 01,. 1998, which is incorporated herein by reference as if fully set forth herein.

The input server 350 receives input from the user's set-top terminal. Both two-way cable and modem/phone return are supported. Input events from the set top box are passed to the appropriate application for processing. The input server 350 typically utilizes special hardware to obtain the user input from the two-way cable plant.

Various embodiments of the invention can operate without requiring any special processing in the client platform 360 or other addressable processing equipment (e.g., set top box) to accomplish any of the functionality described herein. No special client applications are required. Instead, this functionality is inherently provided by the video subsystem of the current set top box through the set top box MPEG decompression and frame buffer system.

Typically, the client platform 360 processes data according to a terminal, text, and graphics (TTG) protocol. The TTG protocol is a thin-wire protocol, which enables the server to communicate with the set top box. TTG protocol provides capabilities including drawing text and graphics, manipulating hot-zones, and presenting graphical 'widgets' for display and user input. Several aspects of the TTG protocol are described in U.S. patent application Ser. No. 09/071,549, entitled "Labelling of Links in Hypertext Document Images, which is incorporated herein by reference as if fully set forth herein.

The IAE can include a navigator that is the standard application used to navigate the ITV content. In addition, the navigator can navigate general web content by utilizing the resources of the crawler 316 and the renderer 320. Applications (which include the navigator) use a high-level object-oriented library to create and display presentations. This library communicates with other server components to deliver media to the user's set top box.

One of the core applications is the interactive program guide that provides the user with up-to-date information on television program schedules, pay-per-view, and video-on-demand services. The IAE can also include a library to provide application programmers with an object-oriented library (e.g., C++) for developing interactive television applications. The IAE library abstracts and simplifies the task of creating ITV applications and eliminates the complexity of communicating with the system software at a low level.

Content tools include TVML. TVML is an extensible SGML specified language, which allows content creators to produce content specifically aimed at the television viewer. Using TVML the creators can play slide shows, add background audio and timing, and overlay text and graphics on images. The video content for the system for preparing multimedia data 300 typically includes TVML combined with HTML.

The TVML pre-viewer is a platform-independent tool capable of displaying TVML to a user for the purposes of developing TVML content.

The content converter works in conjunction with an appropriately configured web server to ensure that all of the content on that server is ready to be pulled into a cable network 355 head-end. The converter converts Targa, JPEG, BMP, GIF, PCX, MES, MT1, TGA, PNG, or any image file format files into MPEG; and converts WAV, AT1, AES, AV1, PCM, au, vox, or any audio format files into Dolby AC-3.

The AVTS 345 can be adapted to read FMB data and create valid digital video streams therefrom. In some embodiments, the application (e.g., browser or guide) requests that the screen be updated by specifying the areas of the screen to be updated. The application can also specify how the areas are to be updated (e.g., replace the area, scroll the area, move the area), and the new image data to be placed on the screen (by specifying which macroblocks from which FMB files are to be used).

The AVTS 345 then assembles the necessary macroblock data by reading the FMB files, and creates the appropriate MPEG frames (i-, p-, and/or b-frames) and transmits the frames to the client platform 360 via the cable network 355. If necessary, the AVTS 345 then sends the empty p-frame to 'push' the previous update frames out.

Methods of Preparing Multimedia Data

MPEG is designed to encode full motion video into a compressed digital stream taking advantage of the redundancy between frames. MPEG encoders typically analyze the video stream and generate a series of i-, p-, and b-frames representing a compressed version of the original source material. Various embodiments of the invention use the functionality provided by MPEG to provide a completely different set of features. These embodiments encode large bitmaps of static content. Then, using MPEG techniques and fat macroblock formatting, these embodiments provide for the display and scrolling of the static content, enable animation of small areas of the display, support picture-in-picture functionality, and allow for amalgamation (overlay and combination) of different image data on the display.

For example, consider the problem of displaying a web page on a television screen. The entire web page cannot fit in the confines of the display since the screen is too small to enable reading of character data at typical television screen viewing distances. Various embodiments of the invention generate a bitmap representing the entire web page (perhaps 2000×4000 pixels in size) and encode this data in a manner that allows an application in real-time to display only a screenful of data (perhaps only 640×480 pixels in size) at a time.

Normally, encoding a bitmap of a static image is not an application of MPEG technology because the bitmap does not display full motion video, only static screen data. Within that web page, however, there may be animated GIF files. Display encoding according to various embodiments of the invention provides updating for only the portion of the screen occupied by the animated image, and animates the image by encoding MPEG data that represents these partial screen updates in real-time. One aspect of various embodiments of the invention includes an algorithm adapted to layout the image content so that the portion of the screen that is being updated does not overlap other areas of the screen that are being changed. The ability to easily generate MPEG data in real-time allows us to smoothly scroll the screen in any direction using motion vectors and partial screen updates.

Various embodiments of the invention encode and store the bitmap data into an MPEG format with additional information that enables quick retrieval of the MPEG data, and creation of valid i-, p-, and b-frames in real-time. The macroblock in an FMB formatted data set can be manipulated without decoding of the macroblock back into the original bitmap image form in which the macroblock is disposed. No inverse DCT (Discrete Cosine Transform) needs to be performed to manipulate a macroblock formatted as FMB. For example, an MPEG macroblock of 16×16 pixels can be encoded using the Discrete Cosine Transform (DCT), quantized according to a quantization matrix, and the resulting data compressed using Huffinan encoding.

The resulting data block can be manipulated without altering the data if the data is stored in a manner such that the variable elements (quantization scale factor, matrix, and color space) are known. Previous MPEG encoders have been designed to encode full motion video, and do not provide this ability to store large bitmaps bigger than the screen display.

MPEG encoding technology that does not use FMB formatted data sets and file formats is not designed for on-the-fly generation of MPEG data to provide scrolling and partial screen updates in the manner described above.

This ability to efficiently manipulate encoded MPEG data, i.e., because it is encoded using our fat macroblock technique, allows for a picture-in-picture scheme where a full motion window is displayed on top of a static background. Using the image combination capabilities of b-frames also allows us to encode the background image with one quality and an overlay image with another (for example, encoding the background picture with a lower quality than the overlaid text). Without the FMB encoding scheme, generating valid MPEG streams from the original bitmap data in real-time would be prohibitively difficult because of the large amounts of processing power required. Various embodiments of the invention allow the application to specify a region of the FMB data to be displayed, and a target area of the screen to be updated. In real-time, the application can generate an MPEG stream (for example, a p-frame) that represents updating the desired portion of the screen without consuming excessive processing resources. The application achieves this by reading the macroblocks out of the FMB data sets (which are indexed with header information for quick lookup and access), adding the necessary headers for the data stream, and streaming the data onto the network.

Various embodiments of the invention also allow for the FMB data to come from many disparate files and then combined into a single MPEG frame. For example, a full or partial screen replacement can be generated from three different FMB data sets and sent as a single p-frame or i-frame update. These approaches provide solutions to the problem of efficiently displaying large amounts of static and animated bitmap data using MPEG (or other comparable digital video standards).

As shown in FIG. 4, various embodiments of the invention provide a method for preparing multimedia data for transmission using digital video data compression. The method for preparing multimedia data comprises pre-rendering a bitmap (block 410), and determining a viewable area of the video images to be displayed (block 420). Pre-rendering of the bitmap creates a compressed form of the bitmap. The bitmap includes content of a series of video images of multimedia data. The video images have a full-sized area. The viewable area can be smaller than the full-sized area.

Some embodiments of the invention provide a method for transmitting multimedia data using digital video data compression. These method include pre-rendering (block 410) and determining the viewable area (block 420); and also include transmitting frames of data representing portions of the video images to processing equipment (block 430). The processing equipment is connected to at least one display 370.

Process Description

This section describes the basic processes involved in preparing, manipulating, encoding, and delivering content.

Content Preparation

Content preparation ensures that the active areas of any variable element do not share any macroblocks with any active area of any other variable element. This allows the variable areas to be updated independently.

The following is a non-exhaustive list of possible pre-processing, or preparation, steps:

An HTML frame can be made to have its left boundary adjusted so that it begins on the leftmost pixel location of a macroblock, landing in either the current macroblock if the left edge is already at the leftmost pixel location, or else the next macroblock to the right of the current macroblock. Similarly, the right boundary is adjusted so that it lands on the rightmost pixel location of a macroblock. Similarly, the top boundary is adjusted so that it lands on the topmost pixel location of a macroblock. Similarly, the bottom boundary is adjusted so that it lands on the bottom most pixel location of a macroblock. The edges may or may not be adjusted to include or exclude any frame delimiters.

An HTML form element can be created or adjusted so that the form element maintains a minimum n/2 pixel wide passive area (where n is the macroblock size) around the perimeter of the set of all active areas of the form element. This passive area ensures that the form element does not encroach on another HTML element that needs to be updated, and ensures that the active area of the content is within an area that is bounded by macroblocks. For example an MPEG system with 16 pixel×16 pixel macroblocks would have an 8-pixel border around such elements.

An animated GIF can be size adjusted to include a passive area around each of the images in the animated GIF of at least n/2 pixels, so that the resultant images are all of the same size. Alternatively, the images within the animated GIF can be set to the largest image within the animated GIF, or the content encoding step can ensure sufficient information is kept to allow clearing of the necessary regions on the user screen or intermediary device at runtime.

MPEG video data can be modified either in real-time, or prior to transmission, to update only a portion of the screen, resulting in a picture-in-picture effect for the end user.

Content Separation

The content can be separated into regions of the screen. A region is either changeable or permanent. Permanent regions can optionally be collectively encoded into a single static macroblock file. Regions can occur as a result of HTML frames, TVML windows, or any other directive. For each of the regions, the steps for content decoding/rendering and content encoding are performed, and the resultant information is identified by region, or otherwise kept separately by region. Content changes are handled separately for each region.

Content Decoding/Rendering

The content can be decoded and/or rendered into a series of bitmaps. One bitmap can be created first with all of the static elements, including the static background colors, bitmaps, etc., upon which the variable content will be placed. Then, for each variable element, such as form elements and animated GIFs, the appropriate sections of the bitmaps can be extracted and saved permanently.

Content Encoding

For the static content, a single file can be created with fat macroblocks. Then, in encoding some variable elements such as animated GIFs, the entire set of instances of the element (e.g., each image within an animated GIF) can be encoded into fat macroblocks using the extracted bitmap. For the remaining variable element types, the saved bitmaps can be used later at runtime to generate the necessary macroblocks based on the runtime changes to the variable elements. Alternatively, some of the passive portions of these variable elements can be pre-encoded into fat macroblocks.

The resultant set of files and fat macroblocks can also be tracked using a specifier such as a table of contents file, database, or markup language. The remaining steps can use the set of files of fat macroblocks, bitmaps and specifiers.

The encoding process can output the values within macroblocks in either a compressed form, or in an expanded form, to facilitate future modification or usage of the values. During the encoding of the variable elements, portions of the variable elements, such as an initial value or an initial display can be placed into the static set of macroblocks.

Content Changes

At runtime, the variable elements can undergo changes. For such changes, the saved bitmap of the area for the variable content is used to decode and/or render new values. The new values are then re-encoded into fat or regular macroblocks. Any portion of a variable content that changes can be sent immediately, or later, as desired.

Content Delivery

The content delivery step includes pulling together the macroblocks to be displayed, and then transmitting the macroblocks to the user display 170 device. The application designates which areas of the screen are to be updated, and from which macroblock data these areas will be updated.

If the entire screen is to be updated, then an i-frame can be generated from the macroblock data. If only a subset of the screen is to be updated, a p-frame is created containing the necessary macroblocks. Should it be necessary to move or scroll data, motion vectors can be included in the p-frame delivery.

Before and/or during packing of the macroblocks, various fields within the set of macroblocks to be transmitted are calculated or re-calculated. This calculation can include the DC (highest frequency discrete cosine transformation matrix value) components, the delta values, the coefficients, and combinations thereof.

Content Updating

As users interact with the content, various portions of the content can be changed in real time. These changes can include scrolling content within regions, updating or changing elements, and animated GIF images. For each variable element or other change or set of changes, the application (and the AVTS 345) collects the macroblocks that are to be changed. Content updating can include initial runtime rendering of data from the saved bitmaps into macroblocks. In an MPEG system, content updating can include marking the bitmap with the updated macroblock information, updating the fields as necessary for the macroblocks to be sent, and then creating the p-frame (or optionally, an i-frame). Bi-directional frames can also be used or added to create special effects (e.g.: fades, wipes, or other image amalgamation effects).

In an MPEG system, to create a p-frame, the application determines any motion vectors required, usually as a result of scrolling of the macroblocks. Then, if necessary, the application creates macroblocks with zero motion vectors for the left edges of the user display 370 device to establish the required initial values for the fat macroblock strip. Then the application calculates and/or re-calculates the fields (as per content delivery) within the macroblocks to be sent. The application can include or add skipped macroblocks as necessary within the p-frame.

To use an i-frame instead, the application packs all the necessary macroblocks into an i-frame without the use of motion vectors and/or left-edge zero motion macroblocks.

Applications

Animation

Animation (for example, animated GIF's on web pages) can be accomplished by pre-encoding FMB files containing each frame of the animated GIF. The host system can then play these frames according to the timing contained in the original file. Animation can also be done on the fly in real-time, with the frames and timing determined by the application.

Picture-in-Picture

A video stream can be pre-encoded or encoded in real-time as macroblocks for display in an area of the screen resulting in a picture-in-picture effect. For a series of images providing a picture-in-picture (PIP) display, only the macroblocks for the PIP area of the screen contain updated data. The FMB formatted data sets can be encoded to represent an MPEG data stream corresponding to full motion video for an area smaller than the visible screen size. The compressed FMB formatted data sets can be streamed to the set top box.

Using the FMB capabilities for building valid MPEG streams in real-time, the full motion portion can be placed anywhere on the screen. The full-motion portion can include data streams transmitted in real-time from live video sources. The picture-in-picture updating can utilize p- and b-frames to update a subset of the screen either by replacing the small area entirely (as an i-frame does for the entire screen), by using motion vectors (to do panning, for example), and by using b-frames to combine the contents of the screen with new data.

Given that a certain window is updated, one approach is to transmit 30 p-frames per second to replace the entire window with a new image. This approach is analogous to sending 30 i-frames a second to replace the full screen and is fairly inefficient. A slower transmission rate could also be used to reduce channel bandwidth usage, but would suffer from a degraded image transition. However, encoding the frames as FMB data sets, and transmitting p-frames (and perhaps b-frames) of the FMB data to change only a part of the window contents, makes transmission more efficient without loss of image transition quality. This capability can be covered by the ability to send p-frames that entirely replace the PIP window contents.

Image Amalgamation

Image amalgamation, such as fading or wiping, can be accomplished using p- or b-frames. Video images or text can be composited into a background image without having to encode the background data into the video operation. An example of image amalgamation is discussed in greater detail in Example 5, below.

Smooth Scrolling

By using motion vectors, b- and p-frames, a very smooth scroll of content in any direction can be achieved. The smooth scrolling enables the user to view different portions of a page that is not viewable in its entirety on the user display 370. A discussion of one method of obtaining smooth scrolling using FMB formatted data sets is provided below in Example 2.

EXAMPLE 1

Displaying Text Portions of an Image with Improved Resolution

As an example, a viewable area of a bitmap can be sent as an i-frame. The source material for the bitmap is at a first resolution level, e.g., 800×600. A p-frame updating a text portion of the viewable area comes from source material at a second resolution level, e.g., 1600×1200. A series of p-frames and/or b-frames corresponding to a picture-in-picture display that updates another portion of the viewable area comes from source material at a third resolution level, e.g., 640×480. The series of images viewed by the user includes source materials at three different resolution levels.

The FMB format allows the application to encode content that contains a background image with text by encoding the macroblocks that contain only the background image with a larger quantization scale factor, and the macroblocks containing text with a smaller scale factor. This can be done to ensure that a viewer can easily read an updated text portion of the image.

The larger quantization scale factor for the background image data results in a smaller corresponding macroblock data set, with a commensurate loss of image quality. This is acceptable because the user is not adversely affected by the loss of background image quality. More importantly, the larger quantization scale factor for the background image data reduces the channel bandwidth and processing time required to transmit the corresponding stream of data.

The smaller quantization scale factor for the text data results in a larger corresponding macroblock data set, i.e. less compressed than the background macroblock data set. Therefore, the text is provided with a higher image quality. The result is in an image provided on the display having clear text, while maintaining the ability to efficiently compress the image data back at the AVTS 345.

Previous implementations of macroblock encoding did not include pointers to individual macroblocks. Therefore, one of the limitations characteristic of those implementations is that the smallest unit of data that can be identified in the coded and compressed bitstream associated with a frame of data without decoding the bitstream is a slice, or strip. The positions of the other macroblock address increments in the bit stream of data for each slice vary in accordance with the variable-length coded data and therefore can not be retrieved without decoding the bitstream.

EXAMPLE 2

Smooth Scrolling

By using motion vectors, b- and p-frames, a very smooth scroll of content in any direction can be achieved. A sequence of frames is sent to the decoder moving the data one macroblock strip at a time. The FMB encoding scheme makes creation of the sequence of frames possible in real-time.

Referring to the FMB formatted image layout 100 shown in FIG. 1, the viewable area of the screen can be a rectangular region including macroblocks A1 through C4. To smoothly scroll the screen, a sequence of the following frames can be sent to the decoder:

Step 1: an i-frame for rectangle A1–C4
Step 2: a p-frame motion vector to translate B1–C4 to occupy location A1–B4
Step 3: a p-frame replacement for block C1–C4 with data from D1–D4
Step 4: an empty p-frame to 'push out' resulting image
Step 5: repeat Steps 2–4 until desired area is being viewed Note that Step 4 is required because the video subsystem in the set-top box buffers the incoming frames and does not play the last frame until the next frame arrives. The empty p-frame is sent, therefore, to push out the last frame played, such as the scrolling motion vector p-frame request. The empty p-frame includes all macroblocks coded as skip blocks.

EXAMPLE 3

Displaying a Previously Cached Web Page or TVML Content

The browser 340 application, through user input, can be requested to play a particular URL. The browser 340 translates this URL into a form that represents the URL location on disk in the server system. The browser 340 checks this location for the existence of a markup language file in the rendered cache 330. If the file exists, this means that the content is present. The markup language file is read, thus informing the browser 340 of the location of the FMB files and/or TVML i-frame files, and audio files necessary to display the content. The browser 340 then makes a request to the AVTS 345 to play a part of the FMB file (either a full screen as an i-frame, or part of a screen for a scroll or animated GIF update). The AVTS 345 then reads the FMB data and creates the necessary i- or p-frame and streams the frame through the MUX hardware (e.g., the MPEG multiplexer card 347) onto the cable network 355. The frame is captured by the set top box and displayed.

EXAMPLE 4

Displaying an Uncached Web Page or TVML Content

If no file for the requested URL is present in the rendered cache 330, the browser 340 makes a request to the crawler 316 to fetch the URL from the Internet. The crawler 316 connects to the web server specified in the URL and obtains the HTML or TVML file, and writes the file to the source cache 318. The crawler 316 then reads the file to determine if any additional assets (audio or image files) need to be fetched. If so, the crawler 316 fetches these assets.

During this process, the crawler 316 keeps the browser 340 informed as to how many assets have been fetched and how many are left to fetch. When all the assets are fetched, the browser 340 makes a request to the renderer 320 to render the content. The renderer 320 reads the HTML or TVML source data from the source cache 318, renders the content into FMB and markup language files, and writes these files to the rendered cache 330.

When this is complete, the renderer 320 informs the browser 340. The markup language file is read by the browser 340, thus informing the browser of the location of the FMB files and/or TVML i-frame files and audio files necessary to display the content. The browser 340 then makes a request to the AVTS 345 to play a part of the FMB file (either a full screen as an i-frame, or part of a screen for a scroll or animated GIF update). The example then proceeds as stated above in example 3.

EXAMPLE 5

Image Amalgamation

The FMB format can also provide image amalgamation between two frames of data. The image amalgamation can include fading and wiping effects. In the example discussed below an i-frame and a p-frame can be sent to the client platform 360. Note that the use of the image amalgamation method discussed below can also implemented for two p-frames sent to the client platform 360. Also, the image amalgamation can be performed at the server complex prior to transmission of the frames to the client platform 360.

As discussed above in the definitions section, a b-frame is a bidirectional predicted frame. For each b-frame, an i-frame and a p-frame can be used as references.

In one example, three frames: I, B, P can be used to create a "fade" effect from the i-frame to the p-frame. The fade effect provides a smooth transition from the i-frame image to the p-frame image, e.g., a morphing effect.

There are three pixels in the three frames with same position (x,y), e.g., I(x,y), B(x,y) and P(x,y). A difference between the i-frame and the b-frame, d(I,B), and a difference between between the b-frame and the p-frame, d(B,P), can be calculated as follows.

$$d(I,B)=I(x,y)-B(x,y)$$

$$d(B,P)=P(x,y)-B(x,y)$$

The average of these two differences can be obtained by:

$$average=(d(I,B)+d(B,P))/2$$

This "average" represents the average predicted error for frame B from frame I and from frame P. Now, if we set the average=0, then $$d(I,B)+d(B,P)=0,$$

which means $$I(x,y)-B(x,y)+P(x,y)-B(x,y)=0,$$

so $$B(x,y)=(I(x,y)+P(x,y))/2$$

If frame I and frame P have already been transmitted to the client platform 360, then transmitting one or more "zero B-frames" can enable the client platform 360 to generate the actual B frames. This can be accomplished by using the decode time-stamp (DTS) value placed in the data stream header by the AVTS 345. For example, if the i-frame has a DTS value of 0, and the p-frame has a DTS value of 4, then if the "zero-b-frame" has a DTS value of 2, the client platform 360 generates a image having values midway between the i-frame and p-frame values upon receipt of the empty b-frame.

If the background is black, say "0", and the text is white, say "255", then on the screen, all the text will be shown in gray scale "128". The contrast of the text will be reduced.

Alternatively, the ATVS 345 can send a series of three empty b-frames with DTS values of 1, 2, and 3, respectively to the client platform 360. In this case the first empty b-frame (with a DTS value of 1) causes the client platform 360 to display an image that represents the i-frame with 25% of the difference between the i-frame and the p-frame, e.g., 64. The second empty b-frame (with a DTS value of 2) causes the client platform 360 to display an image that represents the i-frame with 50% of the difference between the i-frame and the p-frame. The third empty b-frame (with a DTS value of 3) causes the client platform 360 to display an image that represents the i-frame with 75% of the difference between the i-frame and the p-frame, e.g., 192.

Based on this approach, a fade from the i-frame image to the p-frame image using one or more empty b-frames can be readily implemented using the FMB formatted data sets.

The last b-frame transmitted to the client platform 360 can be exactly the same as the p-frame, which means that, B(x,y)=P(x,y). In this circumstance, the following equations hold for the average predicted error.

$$\begin{aligned}average &= (d(I,B)+d(B,P))/2 \\ &= (I(x,y)-B(x,y)+P(x,y)-B(x,y))/2 \\ &= (I(x,y)+P(x,y)-2B(x,y))/2, \quad \text{and therefore because } B(x,y) \\ &= P(x,y) \\ &= (I(x,y)-P(x,y))/2\end{aligned}$$

Once we code these averages as a b-frame, the actual image for the last b-frame will be exactly the same as next p-frame. By changing these average errors gradually, the fade effect can be created.

The ability to average the content of frames can also be used to generate a smooth 'wipe' of the screen from one image to another. A coarse wipe can be accomplished using only p-frames to replace the old image with a new one from left to right, top to bottom, or any combination thereof. But, using b-frames to average the data on the edge that is being moved to create the wipe effect results in a much smoother wipe effect.

EXAMPLE 6

Use of Markup Language Specifiers

Some embodiments of the invention use a mark-up language adapted to enable fat macroblock compression techniques. For these embodiments, the frame element of the markup language describes a single independently scrollable "window" of a screen. A frame is composed of a static scrollable image that is typically stored as a fat macroblock, a set of active elements (e.g. forms, and animated GIFs), and a set of links (defined in the markup language as an anchorset).

The frame can also include a set of assets to check against cookies (defined in the markup language as a cl element), and a set of hash reference locations (defined in the markup language as an hl element). The fat macroblock can be named using a (source) src tribute. Other embodiments use different techniques, such as databases, to replace the function of the markup language description. The content stored can represent any image that includes partial screen motion or partial screen updating, and is not limited to web pages.

According to one mark-up language used with the FMB's, the size attribute is the absolute width and height of the entire frame contents in pixels. The coords attribute provides to position of the top left corner, and the width and height of the visible frame, or viewable portion of the image. According to this mark-up language, the size attribute and the coords attribute are mandatory attributes.

The coordinates for the links of a frame are in the coordinate space of the frame. The browser 340 can adjust these coordinates depending on the location of the frame and the current scroll position. Note that the scrolling rate is application dependent. The renderer 320 can draw frame borders (and adjust frame positions and sizes accordingly). The browser 340 can also operate with frames that have been rendered in their entirety into one large frame.

A graphics language compression routine compresses one strip of macroblocks at a time in the rectangular area passed to it. Upon completion of all strips, the compress routine returns back to the renderer 320 an array of integer offsets, one for each processed strip. The compress routine also returns offsets to each macroblock in the strip back to the renderer 320.

In some embodiments, the integer offsets and offsets returned to each macroblock can be stored in the FMB image header 210. Some embodiments use a markup language as a specifier. The markup language file can store the list of integers as a comma delimited string of numbers in the "offsets" attribute of any "src" file that is an FMB file (e.g., as static, form elements and animated GIFs). Additionally, the compress routines can put the integer values into the fixed size header in the FMB file itself. If the HTML page is too long, the header in the FMB file will overflow, the page will not be viewable to the user, and the operation should be aborted.

In some embodiments, each strip begins on an 8-byte boundary. Each strip includes the aforementioned header, then padding to the next 8-byte boundary, and then the macroblocks for the strip, all bit-wise packed together.

Each strip header entry in the FMB image header 210 contains the bit starting location for each macroblock in the strip, as well as the absolute DC component for each macroblock. The bit starting locations and absolute DC component enable the AVTS 345 to readily adjust the first macroblock pulled out of a strip (e.g., when displaying something, there may be horizontal scrolling, in which the first macroblock to display may not be the first macroblock in the strip).

MPEG encoded frames sent to a set top box contain a series of horizontal slices that are represented by corresponding strips of fat macroblocks. In a television screen of 480 vertical pixels, and with each MPEG macroblock being defined as 16×16 pixels, there will be 30 strips of fat macroblocks. A screen width of 640 pixels will be 40 macroblocks wide. A screen width of 704 pixels will be 44 macroblocks wide.

In order to reliably update video data for a display 370, data representing each horizontal slice in a frame needs to be present. However, only the first macroblock of a strip needs to actually be in the frame. This frame configuration is allowed because a macroblock can be implied to be present either by the skip value in the macroblock (right after a missing section), or by there being no more macroblocks before the start of a new strip of macroblocks.

If the first macroblock of a strip is not changing, it is customary to send down a motion vector for the first macroblock. The motion vector specifies that the macroblock is to be sourced from that very same location, as opposed to downloading the macroblock itself (which is comparatively bigger). This is called a zero displacement motion vector. In some embodiments, additional values can be supplied in a motion vector.

Typically, a strip representing a image slice will either specify a new (replacement) macroblock for the first macroblock in the strip, or specify a zero displacement motion vector. Following the first macroblock representation, the strip will contain zero, one or more macroblock. In some circumstances, holes are placed between the subsequent macroblocks. The holes can be represented by a skip counter in the next macroblock.

In frames formatted according to some embodiments of the invention, each strip can contain macroblocks or groups of macroblocks from several different FMB files.

The IAE can output a series of commands to the AVTS 345 as to which blocks to include in the frame to be sent to the set top box. The IAE can also send "updates" to the AVTS 345 in order to provide scrolling, animated GIFs, and changed areas on the display 370 due to form elements.

In some embodiments, the AVTS 345 does not maintain any context, and thus needs to be informed explicitly as to what macroblocks are to be sent, and from which FMB files these macroblocks can be sourced.

According to one approach, the IAE builds an in-memory representation of the screen in a 44×30 array of "macroblocks". The IAE does not have actual access to any macroblocks. However, the IAE does have knowledge about which macroblocks are needed and where the macroblocks come from.

In some circumstances, other factors need to be considered. The screen can be built up from a number of FMB files, some representation HTML frames, static areas such as frame borders, the static portion within each HTML frame, and a number of variable elements within an HTML frame. The variable elements in the HTML frame can include form elements, animated GIFs, motion in a window, and runtime selectable window substitutions (for example, user specific advertisements).

Once an initial frame is sent (i-frames contain actual macroblocks for everywhere on the screen), the IAE can send partial frames (P-frames contain macroblocks for only those areas that change on the display 370).

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

For example, all the disclosed elements and features of each disclosed embodiment can be combined with, or substituted for, the disclosed elements and features of every other disclosed embodiment except where such elements or features are mutually exclusive.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements. The appended claims are not to be interpreted as including means-plus-function limitations, unless such a limitation is explicitly recited in a given claim using the phrase "means-for." Expedient embodiments of the invention are differentiated by the appended sub-claims.

What is claimed is:

1. In a digital video communication system including a server, a method of preparing digital video data using digital video data compression in a computer at said server for transmission to a settop box at a user terminal coupled to said server by a digital video signal distribution system, the method comprising:

pre-rendering a bitmap to create a compressed form of the bitmap, the bitmap including content of a series of video images of the digital video data, the video images having a full-sized area; and determining a viewable area of the video images to be displayed, the viewable area of the video images is smaller than the full-sized area, wherein:

the content includes at least one of fixed content and variable content, the fixed content having a lifetime in the series of video images, and portions of the variable content having lifetimes less than the lifetime of the fixed content; and the method further comprises encoding the content as at least one data set formatted as at least one fat macroblock and a fat macroblock header, said fat macroblock header identifying a plurality of macroblocks within said full-sized area, said plurality of macroblocks forming a fat macroblock from an array of rows and columns of macroblocks of said full-sized area.

2. The method of preparing digital video data of claim 1, including:

designating screen areas for updating;

designating macroblocks corresponding to the screen areas;

responsive to a designation for updating an entire screen, generating an intra frame from corresponding macroblock data; and responsive to a designation for updating a subset of the screen, creating one of a predicted frame and a bi-directional frame including macroblocks required for the updating of the subset of the screen.

3. The method of preparing digital video data of claim 2, wherein:

the content includes multimedia elements; and the method further comprises, responsive to user input, changing the content, the changing including collecting macroblocks to be changed for each element to be changed.

4. The method of preparing digital video data of claim 3, further comprising rendering the content of the video image, the rendering including:

extracting selected sections of bitmaps for variable multimedia elements;

saving the selected sections; and rendering the selected sections into updated macroblocks.

5. The method of preparing digital video data of claim 4, wherein:

the encoding is performed according to MPEG specifications; and the method further comprises marking the bitmap with the updated macroblocks.

6. The method of preparing digital video data of claim 5, further comprising creating one of a predicted frame and a bi-directional frame including the updated macroblocks, the creating including determining any required motion vectors for the updated macroblocks.

7. The method of preparing digital video data of claim 4, wherein the video images include animation, the animation corresponds to fat macroblocks containing each frame of an animated sequence of images.

8. The method of preparing digital video data of claim 4, further comprising updating macroblocks for a portion of the viewable area corresponding to a picture-in-picture display, the updated macroblocks including one or more of predicted frames and bi-directional frames including images corresponding to full motion for the picture-in-picture display.

9. The method of preparing digital video data of claim 8, wherein the updating includes one or more of:

using motion vectors for panning;

completely replacing the macroblocks corresponding to the picture-in-picture display; and using data streams transmitted in real-time from at least one live video source.

10. The method of preparing digital video data of claim 4, wherein the video images include smooth scrolling the viewable area, the viewable area provided as a screen image on at least one of the displays, the smooth scrolling including:

moving the viewable region a distance corresponding to at least one macroblock, the moving creating a missing region on the screen image;

filling the missing region with macroblock data using motion vectors; and replacing the screen image.

11. The method of preparing digital video data of claim 4, further comprising amalgamating an image between a first frame of data and a second frame of data, the amalgamating including generating at least one bi-directional frame corresponding to values disposed between first frame values and second frame pixel values.

12. The method of preparing digital video data of claim 11, wherein the encoding provides values within the macroblocks in compressed forms with different quantization factors.

13. The method of preparing digital video data of claim 11, wherein:

the first frame comprises an intra-frame having a first decoder time stamp value;

the second frame comprises a predicted frame having a second decoder time stamp value; and the at least one bidirectional frame includes at least one zero frame having a decoder time stamp value greater than the first time stamp value and less than the second time.

14. The method of preparing digital video data of claim 11, wherein the amalgamating includes one of fading and wiping.

15. The method of preparing digital video data of claim 2, wherein:

the content includes multimedia elements; and the method further comprises, responsive to at least one of predetermined timing, calculated timing, and random timing, changing the content, the changing including collecting macroblocks to be changed for each multimedia element to be changed.

16. The method of preparing digital video data of claim 1, wherein:

the content includes variable multimedia elements; and the method further comprises, when transmitting, determining the variable content to update a group of the variable multimedia elements from selected sections disposed in at least one strip of fat macroblocks, each strip represents a horizontal area of one video image in the series of video images.

17. The method of preparing digital video data of claim 16, wherein:

each macroblock represents a square array of pixels including N pixels on each side of the square array, N is an even number;

the variable multimedia elements include passive areas and active areas, the active areas include content subject to change during the lifetime of the variable content; and pre-rendering includes formatting the active areas to ensure that no active area of a first variable element shares a macroblock with any active area of another variable multimedia element.

18. The method of preparing digital video data of claim 17, wherein the pre-rendering includes placing a border enclosing each active area, the border enclosing each active area extends outward from the corresponding active area by at least approximately N/2 pixels.

19. The method of preparing digital video data of claim 17, wherein encoding includes saving a group of the active areas as bitmap files.

20. The method of preparing digital video data of claim 19, wherein the bitmap files and fat macroblocks are tracked using a specifier, the specifier including one of a look-up table, and a markup language.

21. The method of preparing digital video data of claim 17, wherein the frames of data correspond to the active areas.

22. The method of preparing digital video data of claim 16, including:
rendering new values for the selected sections; and
re-encoding the new values into macroblocks.

23. The method of preparing digital video data of claim 1, wherein each fat macroblock includes macroblock data and said fat macroblock header, said fat macroblock header including encoding parameters for said fat macroblock.

24. The method of preparing digital video data of claim 23, further comprising indexing a group of fat macroblocks as a data set including fat macroblock information organized into strips, each strip includes an indication of a location within the strip for each macroblock disposed in the strip.

25. The method of preparing digital video data of claim 24, wherein
encoding includes compressing data disposed in the macroblocks.

26. The method of preparing digital video data of claim 25, wherein:
each strip has the same number of macroblocks; and
the macroblocks vary in size due to the compression of data disposed in the macroblocks.

27. The method of preparing digital video data of claim 25, wherein:
compressing is performed according to a compression routine;
compressing occurs for one strip of macroblocks at a time; and
upon completion of compressing of all of the strips, the compression routine provides an array of integer offsets to a renderer, each of the integer offsets corresponds to a compressed strip.

28. The method of preparing digital video data of claim 23, wherein the encoding parameters include a quantization factor.

29. The method of preparing digital video data of claim 1, wherein the frames include portions from more different fat macroblock data sets.

30. The method of preparing digital video data of claim 1, wherein the encoding is performed according to MPEG techniques.

31. The method of preparing digital video data of claim 1, wherein encoding includes compressing data disposed in the macroblocks.

32. The method of preparing digital video data of claim 1, wherein:
the pre-rendering includes separating the content into regions of the video images, the separating performed according to a directive;
data processing steps performed after pre-rendering are applied by region; and
information obtained from the data processing steps performed after pre-rendering is maintained separately by region.

33. The method of preparing digital video data of claim 32, further comprising:
determining regions having higher resolution requirements according to the directive; and
applying a different quantization factor to macroblocks corresponding to the regions having higher resolution requirements.

34. The method of preparing digital video data of claim 1, further comprising rendering, the rendering including:
extracting selected sections of bitmaps for variable elements of the video image; and
saving the selected sections, the variable elements including content subject to change during a viewing period.

35. The method of preparing digital video data of claim 34, wherein:
the content includes fixed content having static elements, the static elements include at least one of a background color, and a bitmap corresponding to a portion of the video images; and
the variable elements include at least one of a form element, and an animated graphics file.

36. The method of preparing digital video data of claim 1, wherein the display has a viewing size, and the viewing size is different than the full size area.

37. The method of preparing digital video data of claim 1, wherein:
each of the video images is represented by macroblocks of data, each of the macroblocks is related to a plurality of pixels corresponding to a geometrical portion of the video image;
the video image includes variable content having active areas in which content is subject to change as the variable content changes, and passive areas in which content does not change as the variable content changes; and
pre-rendering includes formatting the active areas to ensure that no active area of a first variable element shares a macroblock with any active area of another variable element.

38. In a digital video data communication system including a server, a method for transmitting digital video data to a settop box at a user terminal coupled to said server by a digital video signal distribution system using digital video data compression, said method comprising:
pre-rendering a bitmap to create a compressed form of the bitmap, the bitmap including content of a series of video images of the digital video data, the video images having a full-sized area;
determining a viewable area of the video images to be displayed, the viewable area is smaller than the full-sized area, and
transmitting frames of data representing portions of the video images to processing equipment, the processing equipment is connected to at least one display, wherein:
the content includes at least one of fixed content and variable content, the fixed content having a lifetime in the series of video images, and portions of the variable content having lifetimes less than the lifetime of the fixed content; and
the method including, prior to transmitting, encoding the content as at least one data set formatted as at least one fat macroblock and a fat macroblock header, said fat macroblock header identifying a plurality of macroblocks within said full-sized area, said plurality of macroblocks forming a fat macroblock from an array of rows and columns of macroblocks of said full-sized area.

39. The method for transmitting digital video data of claim 38, wherein:

the content includes multimedia elements; and the method further comprises, when transmitting, determining the variable content to update a first group of variable elements from selected sections disposed in at least one strip of fat macroblocks, each strip represents a horizontal area of one video image in the series of video images.

40. The method for transmitting digital video data of claim 39, wherein:

each macroblock corresponds to a square array of pixels including N pixels on each side of the square array, N is an even number;

the variable elements include passive areas and active areas, the active areas including content subject to change during the lifetime of the variable content; and pre-rendering includes formatting the active areas to ensure that no active area of a first variable element shares a macroblock with any active area of another variable element.

41. The method for transmitting digital video data of claim 38, including:

designating screen areas for updating;

designating macroblocks corresponding to the screen areas;

responsive to a designation for updating an entire screen, generating an intra frame from corresponding macroblock data; and responsive to a designation for updating a subset of the screen, creating one of a predicted frame and a bi-directional frame including macroblocks required for the updating of the subset of the screen.

42. The method for transmitting digital video data of claim 41, wherein:

the encoding is performed according to MPEG specifications; and the method further comprises marking the bitmap with the updated macroblocks.

43. The method for transmitting digital video data of claim 42, further comprising creating one of a predicted frame and a bi-directional frame including the updated macroblocks, the creating including determining any required motion vectors for the updated macroblocks.

44. The method for transmitting digital video data of claim 42, wherein the video images include animation, the animation corresponds to fat macroblocks containing each frame of an animated sequence of images.

45. The method for transmitting digital video data of claim 38, wherein the frames include portions from more than one fat macroblock data set.

46. In a digital video data communication system including a server and a settop box at a user terminal coupled to said server by a digital video signal distribution system, said settop box responsive to digital video signals from said server to display an image at said user terminal, a method of distributing Internet data to digital cable devices comprising:

pulling initial content from the Internet;

pre-rendering a bitmap corresponding to the initial content to create a compressed form of the bitmap, the bitmap corresponding to a series of video images of the digital video data, the video images having a full-sized area;

determining a viewable area of the video images to be displayed, the viewable area of the video images is smaller than the full-size area; and transmitting frames of data representing portions of the video images to digital cable processing equipment, the digital cable processing equipment is connected to displays for more than one user, wherein:

the initial content includes at least one of fixed content and variable content, the fixed content having a lifetime in the series of video images, and portions of the variable content having lifetimes less than the lifetime of the fixed content; and the method further comprises encoding the content as at least one data set formatted as at least one fat macroblock and a fat macroblock header, said fat macroblock header identifying a plurality of macroblocks within said full-sized area, said plurality of macroblocks forming a fat macroblock from an array of rows and columns of macroblocks of said full-sized area.

47. In a digital video data communication system including a server and a settop box at a user terminal coupled to said server by a digital video signal distribution system, said settop box responsive to digital video signals from said server to display an image at said user terminal, a method of using a television channel to provide Internet access comprising:

pulling initial content from the Internet;

pre-rendering a bitmap corresponding to the initial content to create a compressed form of the bitmap, the bitmap corresponding to a series of video images of the digital video data, the video images having a full-sized area;

determining a viewable area of the video images to be displayed, the viewable area of the video images is smaller than the full-size area;

storing digital video data elements including, the bitmap in a server system;

multiplexing the digital video data elements into frames of data;

transmitting frames of data from the server system to a cable network;

transmitting streams of data representing portions of the video images in a television channel to digital cable processing equipment, the digital cable processing equipment is connected to at least one display for a user, wherein:

the initial content includes at least one of fixed content and variable content, the fixed content having a lifetime in the series of video images, and portions of the variable content having lifetimes less than the lifetime of the fixed content; and the method further comprises encoding the content as at least one data set formatted as at least one fat macroblock and a fat macroblock header, said fat macroblock header identifying a plurality of macroblocks within said full-sized area, said plurality of macroblocks forming a fat macroblock from an array of rows and columns of macroblocks of said full-sized area.

48. In a digital video data communication system including a server, said server storing a full size image, and a settop box at a user terminal coupled to said server by a digital video signal distribution system, said settop box responsive to digital video signals from said server to display an image at said user terminal, a method comprising:

receiving said full size image at said server;

storing said full size image as MPEG macroblocks at said server;

forming a fat macroblock header, said fat macroblock header identifying a plurality of MPEG macroblocks within said full size image, said plurality of MPEG macroblocks forming a fat macroblock from an array of rows and columns of MPEG macroblocks of said stored image; and storing said fat macroblock header at said server.

49. A method in accordance with claim 48, further comprising:

determining a viewable area of said full size image, wherein said viewable area is smaller than said full size image area;

retrieving said fat macroblock header identifying said plurality of MPEG macroblocks as being within said viewable area;

assembling said plurality MPEG macroblocks identified by said fat macroblock header as being within said viewable area as an MPEG digital video signal corresponding to said viewable area of said full size image; and transmitting said MPEG digital video signal to said settop box at said user terminal.

50. A method in accordance with claim 48, further comprising:

inputting scroll information at said user terminal;

transmitting said scroll information to said server;

determining a viewable area of said full size image corresponding to said scroll information, wherein said viewable area is smaller than said full size image area;

retrieving said fat macroblock header identifying said plurality of MPEG macroblocks as being within said viewable area;

assembling said plurality MPEG macroblocks identified by said fat macroblock header as being within said viewable area as an MPEG digital video signal corresponding to said viewable area of said full size image; and transmitting said MPEG digital video signal to said settop box at said user terminal.

51. A method in accordance with claim 48, wherein said fat macroblock header identifies a plurality of MPEG macroblocks within said full size image, said plurality of MPEG macroblocks corresponding to static content.

52. A method in accordance with claim 48, wherein said fat macroblock header identifies a plurality of MPEG macroblocks within said full size image, said plurality of MPEG macroblocks corresponding to variable content.

53. A method in accordance with claim 52, wherein said fat macroblock header corresponding to said variable content identifies a plurality of MPEG macroblocks within said full size image, said plurality of MPEG macroblocks corresponding to an animated GIF image.

54. A method in accordance with claim 52, wherein said fat macroblock header corresponding to said variable content identifies a plurality of MPEG macroblocks within said full size image, said plurality of MPEG macroblocks corresponding to a full motion picture-in-picture video.

\* \* \* \* \*